United States Patent Office 3,045,015
Patented July 17, 1962

3,045,015
TRIAZOLO-[2,3-c]-PYRIMIDINES
George William Miller and Francis Leslie Rose, Macclesfield, England, assignors to Imperial Chemical Industries Limited, London, England, a corporation of Great Britain
No Drawing. Filed Sept. 8, 1959, Ser. No. 838,413
Claims priority, application Great Britain Oct. 3, 1958
8 Claims. (Cl. 260—256.4)

This invention relates to new organic compounds and more particularly it relates to new pyrimidine derivatives which possess valuable therapeutic properties. These compounds are also useful as intermediates in the preparation of related s-triazolo-[2,3-c]-pyrimidine derivatives.

According to the invention we provide pyrimidine derivatives, one tautomeric form of which has the formula:

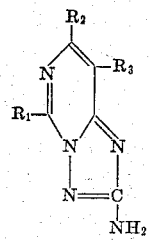

wherein $R_1$, $R_2$ and $R_3$ which may be the same or different, stand for hydrogen or for alkyl, optionally substituted by hydroxy, alkoxy or halogen radicals, alkenyl or cycloalkyl radicals, $R_1$ and $R_2$ which may be the same or different, stand for amino or mono- or dialkylamino radicals, $R_1$ stands for a phenyl or an alkylthio radical, $R_2$ stands for alkoxy or halogen radicals, $R_3$ stands for a halogen radical or $R_2$ and $R_3$ may be joined together to form a polymethylene radical, and the acid-addition salts thereof.

Preferred compounds are those wherein the substituent ($R_3$) stands for hydrogen and the substituents ($R_1$ and $R_2$), the same or different, stand for alkyl radicals. Particularly valuable compounds are those wherein the substituent ($R_3$) stands for hydrogen and the substituents ($R_1$) and ($R_2$), which may be the same or different, stand for methyl, ethyl, n-propyl or n-butyl radicals. A valuable compound possessing bronchodilatory and respiratory stimulant action is 2-amino-5-n-propyl-7-methyl-s-triazolo-[2,3-c]-pyrimidine and a valuable compound possessing action against rheumatoid arthritis is 2-amino-5,7-di-n-propyl-s-triazolo-[2,3-c]-pyrimidine. Other valuable compounds possessing bronchodilatory action are 2-amino-5-n-propyl-7-n-butyl- and 2-amino-5-n-propyl-7-ethyl-s-triazolo-[2,3-c]-pyrimidine.

It is to be understood that the compounds of the present invention of the formula stated above have a skeleton ring structure of the formula:

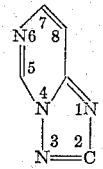

which is s-triazolo-[4,3-c]-pyrimidine, the positions of the carbon and nitrogen atoms being numbered as shown.

According to a further feature of the invention we provide a process for the manufacture of the said pyrimidine derivatives with which this invention is concerned which comprises interacting a pyrimidylhydrazine derivative of the formula:

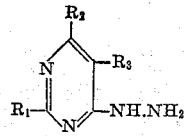

wherein $R_1$, $R_2$ and $R_3$ have the meaning stated above, (except when $R_1$ and $R_2$ stand for amino or mono- or di-alkylamino radicals) or a salt thereof, with cyanogen halide.

A convenient cyanogen halide for use in the above process is cyanogen chloride or cyanogen bromide. The said reaction may be carried out in the presence of an inert diluent or solvent for example water or ethanol. When the hydrazine derivative in the said process is used as the free base, the process may be carried out in the presence of an acid for example dilute hydrochloric or acetic acid in order to effect salt formation and solution of the hydrazine derivative.

The hydrazine derivatives used as starting material may be obtained by interaction of the corresponding halogenopyrimidines for example the chloropyrimidines or the corresponding alkylthiopyrimidines and hydrazine conveniently in the presence of a diluent or solvent for example water, ethanol or β-ethoxyethanol. The halogenopyrimidines themselves, for example the chloropyrimidines mentioned above, may be obtained by interaction of the corresponding hydroxypyrimidines and a phosphorus oxyhalide for example phosphorus oxychloride.

According to a further feature of the invention we provide a process for the manufacture of those compounds of the formula stated above wherein one of the substituents $R_1$ and $R_2$ stands for an amino or a mono- or di-alkylamino radical which comprises reacting a pyrimidine derivative of the formula:

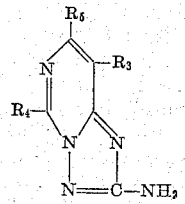

wherein of $R_4$ and $R_5$, one stands for an alkylthio radical or for a halogen radical and the other stands for hydrogen or for an alkyl radical and $R_3$ has the meaning stated above, with ammonia or with a mono- or di-alkylamine at an elevated temperature and pressure.

The reaction is preferably carried out in the presence of a diluent or solvent for example ethanol and at a temperature above 90° C.

It is to be understood that the pyrimidine derivative used as starting material in this process may be replaced by the corresponding isomeric compound which is obtainable from the corresponding pyrimidylhydrazine wherein one of the substituents ($R_1$ and $R_2$) is an alkylthio or a halogen radical by reaction with cyanogen chloride under essentially neutral conditions for example in a buffered medium which is preferably a medium containing acetic acid and sodium acetate.

According to a further feature of the invention we provide a process for the manufacture of the pyrimidine derivatives which comprises ring closure of a compound of the formula:

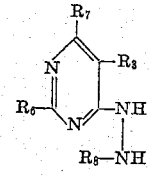

wherein $R_3$ has the meaning stated above, $R_6$ and $R_7$ stand for alkyl or for halogen radicals and $R_8$ stands for the radical —$CONH_2$, —$CSNH_2$ or —$C(NH).S.Alk$ (in the form of a salt) wherein Alk stands for an alkyl radical.

The said ring closure with the compounds wherein $R_8$ stands for the radical —$CONH_2$ is preferably carried out by heating with a phosphorus oxyhalide for example phosphorus oxychloride.

The ring closure with the compounds wherein $R_8$ stands for the radical —$CSNH_2$ or —$C(NH).S.Alk$ (in the form of a salt) is preferably carried out by heating with a desulphurisiing agent for example litharge in the presence of a solvent or diluent for example β-ethoxyethanol.

According to a further feature of the invention we provide a process for the manufacture of the pyrimidine derivatives, which comprises heating a compound of the formula:

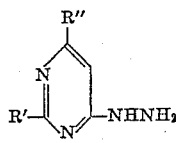

wherein R' and R" stand for alkyl radicals with a compound of the formula:

$$X—C(NH)—NYZ$$

preferably in the form of a salt thereof, wherein X stands for an amino radical or for a lower alkylthio radical and Y and Z stand for hydrogen or for lower alkyl radicals.

According to a further feature of the invention we provide a process for the manufacture of those compounds of the invention wherein $R_3$ stands for an alkyl radical optionally substituted by hydroxyl or halogen radicals which comprises addition of hydrogen, hydroxyl or halogen radicals respectively to the corresponding compound wherein $R_3$ stands for an alkenyl radical.

The said addition of hydrogen may be carried out by reduction of the alkenyl compound with hydrogen in the presence of a diluent or solvent for example ethanol. The addition of hydroxyl radicals may conveniently be brought about by oxidation of the alkenyl compound by means of potassium permanganate in a liquid medium for example in the presence of aqueous acetone. The addition of halogen radicals may be brought about by reaction of the alkenyl compound with halogen for example bromine in the presence of a diluent for example aqueous acetic acid.

According to a further feature of the invention we provide a process for the manufacture of the pyrimidine compounds which comprises interaction of a compound of the formula:

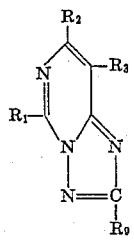

wherein $R_1$, $R_2$ and $R_3$ have the meaning stated above and $R_9$ stands for a reactive substituent, and ammonia or a substance capable of generating ammonia in the reaction medium.

It is to be understood that the starting materials are so chosen that the substituents $R_1$, $R_2$ and $R_3$ are not replaced during the process. The reactive substituent ($R_9$) may be a halogen radical for example a bromine radical and the process may be carried out by heating the starting material with ammonia at a temperature of between 100° and 250° C. and in the presence of a diluent or solvent for example β-ethoxyethanol.

The compounds of the present invention are valuable in that they possess a variety of therapeutic properties. Thus they are bronchodilators and respiratory stimulants and are therefore useful in the treatment of asthma and other respiratory dysfunctions. The compounds possess antibacterial activity. They inhibit the formation of granulomata and are therefore useful in the treatment of rheumatoid arthritis. They also possess sedative and hypotensive properties.

According to a further feature of the invention therefore we provide pharmaceutical compositions comprising as active ingredient one or more of the pyrimidine derivatives of the formula stated above in admixture with a non-toxic pharmaceutical carrier or diluent therefor.

Particularly useful compositions are oral compositions by which the active ingredient can be administered in the form of a solid composition for example as a table, pill or capsule or a liquid composition for example as a solution or suspension. The said compositions are preferably formulated so that when the compositions are used as bronchodilators, each dosage unit contains between 1 mg. and 500 mg., preferably between 10 mg. and 100 mg. of active ingredient and when the compositions are used in the treatment of rheumatoid arthritis, each dosage unit contains between 10 mg. and 750 mg., preferably between 200 mg. and 500 mg. of active ingredient.

The invention is illustrated but not limited by the following examples in which the parts are by weight:

*Example 1*

A stream of cyanogen chloride, previously washed with water, is bubbled through a solution of 2.5 parts of 4-methyl-6-hydrazinopyrimidine in 20 parts of ethanol, which is maintained at a temperature of 25–30° C. until 1.4 parts of the gas are absorbed. The resulting solution is sealed and then kept for one hour at 18–22° C. The reaction mixture is then evaporated to dryness under reduced pressure below 30° C. and the solid residue is dissolved in 10 parts of water and treated with 5 parts of crystalline sodium acetate. The mixture is cooled for one hour at 0° C. and is then filtered. The solid residue is washed thoroughly with water, dried at 60° C. and is then crystallised from ethanol. There is thus obtained 2-amino-7-methyl-s-triazolo-[2,3-c]-pyrimidine as a colourless crystalline solid, M.P. 160° C.

*Example 2*

6.9 parts of 2:4-dimethyl-6-hydrazino-pyrimidine are dissolved in 50 parts of aqueous hydrochloric acid at 25° C. A stream of cyanogen chloride, previously washed with water, is bubbled through the solution which is maintained at 25–30° C. until 3.5 parts of the gas are absorbed. The resulting solution is sealed and allowed to stand for one hour at 18–22° C. The reaction mixture is cooled for one hour at 0° C. and is then filtered. The solid residue is dissolved in 50 parts of water and the solution is adjusted to pH 7 by the addition of crystalline sodium acetate. The mixture is cooled for one hour at 0° C. and is then filtered. The solid residue is washed thoroughly with water, dried at 60° C. and is then crystallised from ethanol. There is thus obtained 2-amino-5:7-dimethyl-s-triazolo-[2,3-c]-pyrimidine as a colourless crystalline solid, M.P. 252° C.

*Example 3*

36 parts of 2-ethyl-4-methyl-6-hydrazino-pyrimidine are dissolved in 237 parts of N aqueous hydrochloric acid at 25° C. A stream of cyanogen chloride, previously washed with water, is bubbled through the solution, which is maintained at 25–30° C. until 16 parts of the gas are absorbed. The resulting solution is sealed and allowed to stand for one hour at 18–22° C. Excess cyanogen chloride is then removed by evaporation under reduced pressure at 18–22° C. 100 parts of crystalline sodium acetate are then added and the mixture is cooled for one hour at 0° C. and is then filtered. The solid residue is washed thoroughly with water and is dried at 60° C. It is crystallised from ethanol and there is thus obtained 2-amino-5-ethyl-7-methyl-s-triazolo-[2,3-c]-pyrimidine as a colourless crystalline solid, M.P. 197° C. It is characterised by having an infra red absorption spectrum (determined by the potassium bromide pressed disc technique) showing prominent absorption bands at 3320, 3150, 2950, 1630, 1550, 1525, 1500, 1430, 1350, 1320, 1206, 1170, 1118, 1032, 985, 970, 862, 844, 802, 775, 767, 751, 738 cm.$^{-1}$.

The 2-ethyl-4-methyl-6-hydrazinopyrimidine used as starting material may be obtained as follows: 57 parts of 2-ethyl-4-methyl-6-chloropyrimidine are dissolved in 160 parts of ethanol at 18–22° C. and the solution is added dropwise to a solution of 40 parts of hydrazine hydrate in 160 parts of boiling ethanol. The mixture is heated under reflux for 15½ hours and is then cooled at 0° C. The mixture is filtered and the filtrate is diluted with 80 parts of benzene and the mixture is evaporated to dryness. The solid residue is boiled with 250 parts of ethyl acetate and the suspension is filtered. The filtrate is cooled for one hour at 0° C. and the mixture is then filtered. The solid residue is washed with cold ethyl acetate, dried at 60° C. and is crystallised from ethanol. There is thus obtained 2-ethyl-4-methyl-6-hydrazino-pyrimidine as a colourless crystalline solid, M.P. 150° C.

The 2-ethyl-4-methyl-6-chloropyrimidine used as starting material has a B.P. of 93° C./20 mm. and may be obtained according to the procedure as described at the end of Example 4.

*Example 4*

5 parts of 2-n-propyl-4-methyl-6-hydrazinopyrimidine are dissolved in 30 parts of N aqueous hydrochloric acid at 25° C. A stream of cyanogen chloride, previously washed with water, is bubbled through the solution, which is maintained at 25–32° C. until 2 parts of the gas are absorbed. The resulting solution is sealed and allowed to stand for one hour at 18–22° C. Excess cyanogen chloride is then removed by evaporation under reduced pressure at 18–22° C. 10 parts of crystalline sodium acetate are then added and the mixture is cooled for one hour at 0° C. and is then filtered. The solid residue is washed thoroughly with water and is dried at 60° C. It is crystallised from ethanol and there is thus obtained 2-amino-5-n-propyl-7-methyl-s-triazolo-[2,3-c] - pyrimidine as a colourless crystalline solid, M.P. 169° C. It is characterised by having an infra red absorption spectrum (determined by the potassium bromide pressed disc technique) showing prominent absorption bands at 3320, 3180, 2950, 2910, 1650, 1630, 1550, 1528, 1500, 1430, 1380, 1350, 1325, 1265, 1206, 1168, 1120, 1030, 860, 840, 800, 770, 740 cm.$^{-1}$.

The 2-n-propyl-4-methyl-6-hydrazino-pyrimidine used as starting material may be obtained as follows: 10 parts of 2-n-propyl-4-methyl-6-chloropyrimidine are dissolved in 13 parts of ethanol at 18–22° C. and the solution is added dropwise to a solution of 6.5 parts of hydrazine hydrate in 13 parts of boiling ethanol. The mixture is heated under reflux for 16 hours and is then cooled at 0° C. The mixture is filtered and the filtrate is diluted with 10 parts of benzene and the mixture is evaporated to dryness. The residue is extracted with 100 parts of ethyl acetate at 18–22° C., the suspension is filtered and the filtrate is evaporated to dryness. The solid residue is crystallised from a mixture of ethyl acetate and petroleum ether (B.P. 40–60° C.). There is thus obtained 2-n-propyl-4-methyl-6-hydrazino-pyrimidine as a colourless crystalline solid, M.P. 87° C.

The 2-n-propyl-4-methyl-6-chloropyrimidine used as starting material may be obtained as follows: 88 parts of 2-n-propyl-4-methyl-6-hydroxypyrimidine are added to 330 parts of phosphorus oxychloride and the mixture is heated gently under reflux for 3¾ hours in an oil bath heated at 150° C. The clear solution is allowed to cool slightly and then reduced to half-volume under reduced pressure. The residual solution is cooled to 18–22° C. and is then poured slowly into a well stirred mixture of 1,000 parts of ice and 300 parts of 40% aqueous sodium hydroxide solution. When the addition is complete the mixture is stirred for one hour and is then extracted three times using 500 parts of chloroform each time. The chloroform extracts are combined and washed with 100 parts of ice-water, dried over anhydrous magnesium sulphate and finally evaporated at 60° C. and 24 mm. pressure. The residual brown oil is then distilled under reduced pressure and there is thus obtained 2-n-propyl-4-methyl-6-chloropyrimidine, as a pale yellow oil, B.P. 108–110° C./24 mm.

*Example 5*

5 parts of 2-isopropyl-4-methyl-6-hydrazino-pyrimidine, M.P. 86° C., are dissolved in 30 parts of N aqueous hydrochloric acid at 25° C. A stream of cyanogen chloride, previously washed with water, is bubbled through the solution, which is maintained at 25–30° C. until 2 parts of the gas are absorbed. The resulting solution is sealed and allowed to stand for one hour at 18–22° C. Excess cyanogen chloride is then removed by evaporation under reduced pressure at 18–22° C. 15 parts of crystalline sodium acetate are then added and the mixture is cooled for one hour at 0° C. and is then filtered. The solid residue is washed thoroughly with water and is dried at 60° C. It is crystallised from ethanol and there is thus obtained 2-amino-5-isopropyl-7-methyl-s-triazolo-[2,3-c]-pyrimidine, as a colourless crystalline solid, M.P. 174° C.

It is characterised by having an infra-red absorption spectrum (determined by the potassium bromide pressed disc technique) showing prominent absorption bands at 3310, 3180, 2960, 2910, 2860, 1627, 1550, 1518, 1500, 1420, 1350, 1310, 1206, 1165, 1118, 1095, 1050, 1020, 948, 860, 850, 778, 753 cm.$^{-1}$.

The 2-isopropyl-4-methyl-6-hydrazino-pyrimidine M.P. 86° C. and the 2-isopropyl-4-methyl-6-chloropyrimidine, B.P. 108–110° C./24 mm. used as starting materials may be obtained according to the procedures described at the end of Example 4.

*Example 6*

5 parts of 2-phenyl-4-methyl-6-hydrazino-pyrimidine, M.P. 96° C., are dissolved in 30 parts of 2 N aqueous hydrochloric acid by warming to 50° C. The solution is then cooled to 25° C., and a stream of cyanogen chloride, previously washed with water, is bubbled through the solution which is maintained at 25–30° C. until 1.7 parts of the gas are absorbed. The resulting solution is sealed and allowed to stand for one hour at 18–22° C. Excess cyanogen chloride is then removed by evaporation under reduced pressure at 18–22° C. 10 parts of crystalline sodium acetate are then added and the mixture is cooled at 0° C. and filtered. The solid residue is washed thoroughly with water, dried at 60° C. and is cryastllised from methanol. There is thus obtained 2-amino-5-phenyl-7-methyl-s-triazolo-[2,3-c]-pyrimidine, as a colourless crystalline solid, M.P. 193° C.

*Example 7*

5.1 parts of 2-methylthio-4-methyl-6-hydrazino-pyrimidine, M.P. 146° C., are dissolved in 30 parts of 2 N aqueous hydrochloric acid by gentle warming. The resulting solution is cooled to 25° C. and a stream of cyanogen chloride, previously washed with water, is bubbled through the solution, which is maintained at 25–30° C. until 2 parts of the gas are absorbed. The resulting mixture is sealed and allowed to stand for one hour at 18–22° C. and it is then cooled at 0° C. and filtered. The solid residue is washed thoroughly with water, dried at 60° C. and is crystallised from 50% aqueous ethanol. There is thus obtained 2-amino-5-methylthio-7-methyl-s-triazolo-[2,3-c]-pyrimidine as a colourless crystalline solid, M.P. 260° C. with decomposition.

Example 8

5 parts of 2-ethylthio-4-methyl-6-hydrazino-pyrimidine are dissolved in 30 parts of 10% aqueous acetic acid by gentle warming. The solution is cooled to 25° C. and a stream of cyanogen chloride, previously washed with water, is bubbled through the solution which is maintained at 25–30° C. until 1.8 parts of the gas are absorbed. The resulting mixture is sealed and allowed to stand for one hour at 18–22° C. and it is then filtered. The solid residue is ground with 10 parts of crystalline sodium acetate in 100 parts of water and the mixture is then filtered. The solid residue is washed thoroughly with water, dried at 60° C. and is crystallised from ethanol. There is thus obtained 2-amino-5-ethylthio-7-methyl-s-triazolo-[2,3-c]-pyrimidine as a colourless crystalline solid, M.P. 210° C.

Example 9

The process described in Example 4 is repeated except that 5 parts of 6-hydrazino-4-methyl-2-n-propyl pyrimidine are replaced by an equivalent amount of 2-n-butyl-6-hydrazino-4-methyl pyrimidine and there is thus obtained 2 - amino - 5 - n - butyl - 7 - methyl s - triazolo - [2,3 - c]-pyrimidine as a colourless crystalline solid M.P. 168–170° C. from ethanol.

Similarly, from 4-ethyl-6-hydrazino-2-methyl pyrimidine there is obtained 2-amino-7-ethyl-5-methyl-s-triazolo-[2,3-c]-pyrimidine M.P. 198–200° C. (from ethanol);

from 6-hydrazino-2-methyl-4-n-propyl-pyrimidine, 2-amino - 5 - methyl - 7 - n - propyl - s - triazolo - [2,3 - c] - pyrimidine M.P. 182–184° C. (ethanol);

4-n-butyl-6-hydrazino-2-methyl pyrimidine, 2-amino-7-n-butyl-5-methyl-s-triazolo-[2,3-c]-pyrimidine M.P. 169° C. (ethanol);

2,4-diethyl-6-hydrazino-pyrimidine, 2-amino-5,7-diethyl-s - triazolo - [2,3 - c] - pyrimidine M.P. 159–160° C. (ethanol);

2-ethyl-6-hydrazino-4-n-propyl-pyrimidine, 2 - amino - 5 - ethyl - 7 - n - propyl-s-triazolo-[2,3-c)-pyrimidine M.P. 162-164° C. (ethanol);

6-hydrazino-2,4-di-n-propyl-pyrimidine, 2-amino-5,7-di-n-propyl-s-triazolo-[2,3-c]-pyrimidine M.P. 158–159° C. (ethanol);

4-ethyl-6-hydrazino-2-n-propyl pyrimidine, 2-amino-7-ethyl - 5 - n - propyl-s-triazolo-[2,3-c]-pyrimidine M.P. 152–153° C. (ethanol);

4-n-butyl-6-hydrazino-2-n-propyl-pyrimidine, 2-amino-7-n-butyl-5-n-propyl-s-triazolo-[2,3-c]-pyrimidine M.P. 149–150° C. (ethanol);

6-hydrazino-2,4,5-trimethyl-pyrimidine, 2-amino-5,7,8-trimethyl-s-triazolo-[2,3-c]-pyrimidine M.P. 249–251° C. (ethanol);

6-hydrazino-4,5-dimethyl-2-n-propylpyrimidine, 2-amino-7,8 - dimethyl - 5 - n - propyl - s - triazolo - [2,3-c]-pyrimidine M.P. 148–149° C. (ethanol);

5 - ethyl - 6 - hydrazino - 4 - methyl - 2 - n - propyl - pyrimidine, 2-amino-8-ethyl-7-methyl-5-n-propyl-s-triazolo-[2,3-c]-pyrimidine hemihydrate M.P. 108–110° C. (ethanol);

from 6-hydrazino-2-methyl-pyrimidine, 2-amino-5-methyl-s-triazolo-[2,3-c]-pyrimidine M.P. 228–230° C. (ethanol);

from 5-allyl-6-hydrazino-4-methyl-2-n-propyl pyrimidine, 8 - allyl - 2 - amino - 7 - methyl - 5 - n - - propyl - s - triazolo-[2,3-c]-pyrimidine, monohydrate M.P. 85–87° C. (ethanol);

from 6-hydrazino-4-methoxy-2,5-dimethyl pyrimidine, 2-amino - 7 - methoxy - 5,8 - dimethyl - s - triazolo - [2,3 - c]-pyrimidine M.P. 222–223° C. (ethanol);

from 5-bromo-6-hydrazino-4-methyl-2-n-propyl pyrimidine, 2-amino-8-bromo-7-methyl-5-n-propyl-s-triazolo-[2,3-c]-pyrimidine, M.P. 159–160° C. (from ethanol);

from 2-ethoxyethyl-6-hydrazino-4-methyl pyrimidine, 2-amino - 5 - ethoxyethyl - 7 - methyl - s - triazolo-[2,3-c]-pyrimidine M.P. 145–147° C. (ethanol);

from 6 - hydrazino - 2-methyl-4,5-tetramethylene pyrimidine, 2-amino-5-methyl-7,8-teatramethylene-s-triazolo-[2,3-c]-pyrimidine M.P. 211–212° C. (from water);

from 6-hydrazino-2-n-propyl-4-trifluoromethylpyrimidine, 2 - amino - 5 - n - propyl - 7 - trifluoromethyl - s - triazolo-[2,3-c]-pyrimidine M.P. 148–149° C. (light petroleum);

from 6-hydrazino-4-methyl-2-n-pentyl-pyrimidine, 2-amino - 7 - methyl - 5 - n - pentyl - s - triazolo - [2,3 - c] - pyrimidine, M.P. 151–152° C. (from ethanol);

from 4-n-heptyl-6-hydrazino-2-n-propyl pyrimidine, 2-amino - 7 - n - heptyl - 5 - n - propyl - s - triazolo - [2,3-c]-pyrimidine, M.P. 128–129° C. (ethanol);

from 4-cyclohexyl-6-hydrazino-2-n-propylpyrimidine, 2-amino - 7 - cyclohexyl - 5 - n - propyl - s - triazolo - [2,3-c]-pyrimidine M.P. 120–122° C. (ethanol).

Example 10

10 parts of 4-chloro-6-hydrazino-2-methyl-pyrimidine are dissolved in 250 parts of 20% aqueous acetic acid containing 40 parts of crystalline sodium acetate. A stream of cyanogen chloride, previously washed with water, is bubbled through the solution which is maintained at 25–30° C. until 4.2 parts of the gas are absorbed. The resulting suspension is sealed and kept at 18–22° C. for one hour. The reaction mixture is cooled for one hour at 0° C. and is then filtered. The solid residue is suspended in 80 parts of 1 N aqueous hydrochloric acid and the mixture is kept at 18–22° C. for 17½ hours and then cooled at 0° C. The solid residue is recovered, by filtration, washed with ice-water, dried and crystallised from dimethylformamide. There is thus obtained 2-amino-7-chloro-5-methyl-s-triazolo [2,3-c]-pyrimidine as a colourless, crystalline solid M.P. 292–294° C. with decomposition.

The process described above is repeated except that 10 parts of 4-chloro-6-hydrazino-2 methyl-pyrimidine are replaced by an equivalent amount of 4-chloro-6-hydrazino-2-n-propyl pyrimidine and there is thus obtained 2-amino-7-chloro-5-n-propyl-s-triazolo-[2,3-c]-pyrimidine as a colourless solid M.P. 199–201° C. (ethanol).

Example 11

2 parts of 2-amino-7-chloro-5-n-propyl-s-triazolo-[2,3-c]-pyrimidine and 5 parts of n-propylamine in 20 parts of ethanol are heated in a sealed tube at 150° C. for 16 hours. After cooling, the reaction-mixture is evaporated to dryness under reduced pressure and the residue is treated with excess aqueous sodium acetate solution. The solid residue is recovered by filtration, washed with ice-water, dried and crystallised from ethyl acetate. There is thus obtained 2 - amino - 5 - n - propyl - 7 - n - propylamino-s-triazolo-[2,3-c]-pyrimidine as a colourless crystallised solid M.P. 114–116° C.

Example 12

1 part of 2-amino-7-methyl-5-methylthio-s-triazolo-[2,3-c]-pyrimidine and 5 parts of methylamine in 20 parts of dry ethanol are heated at 150° C. for 16 hours. After cooling, the solution is evaporated to dryness under reduced pressure and the residue is crystallised from ethanol. There is thus obtained 2-amino-7-methyl-5-methylamino-s-triazolo-[2,3-c]-pyrimidine as a colourless crystalline solid M.P. 188° C. In a similar manner, from an equivalent amount of ethylamine there is thus obtained 2-amino-5-ethylamine-7-methyl-s-triazolo-[2,3-c]-pyrimidine M.P. 122–124° C. (aqueous acetic acid); from n-propylamine, 2-amino-7-methyl-5-n-propylamino-s-triazolo-[2,3-c]-pyrimidine, M.P. 98–100° C. (ether); from dimethylamine, 2-amino-5-dimethyl-amino-7-methyl-s-triazolo-[2,3-c]-pyrimidine M.P. 133–134° C. (ethanol).

Example 13

5 parts of 6-hydrazino-4-methyl-2-methylthio-pyrimidine are dissolved in 24 parts of 20% aqueous acetic acid containing 10 parts of crystalline sodium acetate. A stream of cyanogen chloride, previously washed with water, is bubbled through the solution, which is maintained at 25–30° C. until 2 parts of the gas are absorbed. The resulting suspension is sealed and is kept for 30 minutes at 18–22° C. and is then cooled in ice-water. The solid is recovered by filtration, washed with water, dried and crystallised from ethanol. There is thus obtained a compound $C_7H_9N_5S$, M.P. 232–234° C. with decomposition.

3 parts of the above compound ($C_7H_9N_5S$) and 11 parts of methylamine in 20 parts of dry β-ethoxyethanol are heated in a sealed tube at 150° C. for 16 hours. After cooling the resulting solution is evaporated to dryness and the residue is crystallised from ethanol. There is thus obtained 2-amino-5-methylamino-7-methyl-s-triazolo-[2,3-c]-pyrimidine as a colourless crystalline solid, M.P. 188° C. (from ethanol).

The process described above is repeated except that 11 parts of methylamine in 20 parts of dry β-ethoxyethanol are replaced by an equivalent amount of dimethylamine in dry ethanol and the sealed tube reaction is conducted at 120° C. There is thus obtained 2-amino-5-dimethylamino-7-methyl-s-triazolo-[2,3-c]-pyrimidine as a colourless crystalline solid M.P. 132–134° C. (ethylacetate).

Example 14

10 parts of 4-chloro-6-hydrazino-2-methyl-pyrimidine are dissolved in 250 parts of 20% aqueous acetic acid containing 40 parts of crystalline sodium acetate. A stream of cyanogen chloride, previously washed with water, is bubbled through the solution which is kept at 25–30° C. until 4.2 parts of gas are absorbed. The resulting suspension is sealed and is kept at 18–22° C. for one hour. The reaction mixture is cooled for one hour at 0° C. and is then filtered. The solid residue is dried in vacuo and there is thus obtained a compound $C_6H_6N_5Cl$ as a yellow crystalline solid M.P. 190–195° C. with decomposition.

2.5 parts of the above compound $C_6H_6N_5Cl$ are heated in a sealed tube with 14 parts of methylamine in 20 parts of ethanol for 12 hours at 100° C. After cooling, the suspension is filtered and the solid residue is crystallised from n-ethanol. There is thus obtained 2-amino-5-methyl-7-methylamino-s-triazolo-[2,3-c] - pyrimidine as a colourless crystalline solid M.P. 278–280° C.

The process described above is repeated except that 14 parts of methylamine are replaced by an equivalent amount of ethylamine. There is thus obtained 2-amino-7-ethylamino-5-methyl-s-triazolo-[2,3-c] - pyrimidine, M.P. 238–240° C. (from n-butanol).

Similarly, from n-propylamine, there is obtained 2-amino-5-methyl-7-n-propylamino-s-triazolo-[2,3 - c] - pyrimidine M.P. 150–152° C. (ethanol); from dimethylamine, 2-amino-7-dimethylamino - 5 - methyl - s - triazolo-[2,3-c]-pyrimidine M.P. 239–240° C. (from methanol) and from ammonia, 2,7-diamino - 5 - methyl - s - triazolo-[2,3-c]-pyrimidine, M.P. 292–294° C. with decomposition (aqueous acetic acid).

Example 15

1 part of 2-amino-7-chloro-5-methyl-s-triazolo-[2,3-c]-pyrimidine and 3 parts of dimethylamine in 16 parts of ethanol are heated in a sealed tube for 16 hours at 120° C. The contents of the tube are cooled and the suspension is filtered and the solid residue is crystallised from methanol. There is thus obtained 2-amino-7-dimethylamino-5-methyl-s-triazolo-[2,3-c]-pyrimidine as a colourless crystalline solid, M.P. 239–240° C.

Example 16

5 parts of 6-hydrazino-4-methyl-2-n-propyl-pyrimidine are dissolved in 20 parts of 20% aqueous acetic acid and 10 parts of crystalline sodium acetate are added. A stream of cyanogen chloride, previously washed with water, is bubbled through the solution which is maintained at 25–30° C. until 2 parts of gas are absorbed. The reaction mixture is sealed and is kept at 18–22° C. for 1 hour. The solid residue is recovered by filtration, washed with water, dried and crystallised from ethyl acetate. There is thus obtained 2-amino-7-methyl-5-n-propyl - s - triazolo-[2,3-c]-pyrimidine, M.P. 169° C.

Example 17

The process described in Example 4 is repeated except that 2 parts of cyanogen chloride are replaced by 3.5 parts of cyanogen bromide and no attempt is made to remove excess cyanogen bromide. There is thus obtained 2-amino-7-methyl-5-n-propyl-s-triazolo-[2,3-c] - pyrimidine, M.P. 169° C.

Example 18

1.6 parts of 6-hydrazino-4-methyl-2 - n - propyl - pyrimidine, 2.1 parts of S-methyl-thiouronium sulphate and 10 parts of water are heated under reflux for 16 hours. The resulting mixture is cooled in ice-water and the solid precipitate is removed by filtration, washed with water, dried and crystallised from ethyl acetate. There is thus obtained 2-amino-7-methyl-5-n-propyl-s-triazolo-[2,3-c]-pyrimidine, M.P. 169° C.

In a similar manner, in place of S-methyl thiuronium sulphate, there may be used equivalent amounts of S-methyl-N-ethyl thiuronium sulphate s-methyl-N-methyl thiuronium iodide or S-methyl-N,N-dimethyl thiuronium sulphate, and there is likewise obtained 2-amino-7-methyl-5-n-propyl-s-triazolo-[2,3-c]-pyrimidine, M.P. 169° C.

Example 19

An intimate mixture of 1.66 parts of 6-hydrazino-4-methyl-2-n-propyl-pyrimidine and 1 part of guanidine hydrochloride is fused at 200° C. for 1½ hrs. The melt is allowed to cool to 18–22° C. and is then finely ground and extracted with boiling ethyl acetate. The ethyl acetate extract is fractionally crystallised and the more soluble compound recovered. There is thus obtained 2-amino-7-methyl-5-n-propyl-s-triazolo-[2,3-c] - pyrimidine, M.P. 169° C.

Example 20

10.5 parts of 4-methyl-2-n-propyl-6-(1'-semicarbazido) pyrimidine and the 84 parts of phosphorus oxychloride are heated under reflux for 2½ hours. The bulk of the excess phosphorus oxychloride is then removed by distillation under reduced pressure. The residue is poured on to ice and excess concentrated sodium hydroxide solution and the suspension so obtained is extracted continuously with ethyl acetate. The extract is dried with anhydrous magnesium sulphate evaporated to small volume and cooled at 0° C. The crystalline deposit is recrystallised from ethyl acetate and there is thus obtained 2-amino-7-methyl-5-n-propyl-s - triazolo - [2,3 - c] - pyrimidine, M.P. 169° C.

The 4-methyl-2-n-propyl - 6(1' - semicarbazido) pyrimidine used as starting material may be prepared as follows:

10 parts of 6-hydrazino-4-methyl-2-n-propyl pyrimidine are dissolved in 60 parts of 2 N aqueous hydrochloric acid at 18–22° C. 4 parts of sodium cyanate are added and the mixture is heated under reflux for 30 minutes. Excess crystalline sodium acetate is added to the hot suspension and the resulting mixture is cooled in ice-water, and the solid product is recovered by filtration, washed with ice-water and dried. The product is crystallised from n-butanol and there is thus obtained 4-methyl-2-n-propyl-6(1'-semi-carbazido) pyrimidine as a colourless crystalline solid, M.P. 237–239° C. with decomposition.

Example 21

1 part of 4-methyl-2-n-propyl-6(thiosemicarbazido-1'-)-pyrimidine is dissolved in 20 parts of boiling 2-ethoxy-ethanol. 5 parts of litharge are added and the suspension is heated under reflux for 25 minutes. The black residue is removed by filtration and the filtrate is evaporated to dryness under reduced pressure. The residue is extracted with boiling ethyl acetate and the extract is treated with charcoal, filtered and cooled in ice-water. The precipitate is recovered by filtration and is recrystallised from ethyl acetate. There is thus obtained 2-amino-7-methyl-5-n-propyl-s-triazolo-[2,3-c]-pyrimidine M.P. 169° C.

The 4-methyl-2-n-propyl-6(thiosemicarbazido-1'-)pyrimidine used as starting material may be prepared as follows:

5 parts of 6-hydrazino-4-methyl-2-n-propyl pyrimidine hydrochloride and 1.95 parts of ammonium thiocyanate are heated under reflux in 110 parts of dry 2-ethoxyethanol for 2 hours. The solid residue is removed by filtration and the filtrate is evaporated to dryness under reduced pressure. The residue thus obtained is warmed with excess sodium acetate solution and then cooled in ice-water. The pale yellow solid is recovered by filtration, washed with water dried and crystallised from 2-ethoxyethanol. There is thus obtained 4-methyl-2-n-propyl-6-(thiosemicarbazido-1'-)pyrimidine as a colourless crystalline solid M.P. 224° C. with decomposition.

*Example 22*

3.3 parts of 4 chloro-2-methyl-6(1'-semicarbazido)pyrimidine and 33 parts of phosphorus oxychloride are heated under reflux for 3 hours. The bulk of the excess phosphorus oxychloride is removed by distillation under reduced pressure and the residue is poured on to ice and excess concentrated aqueous sodium hydroxide solution. The cream-coloured solid is removed by filtration and crystallised from 2-ethoxy-ethanol. There is thus obtained 2-amino - 7 - chloro - 5 - methyl-s-triazolo-[2,3-c]-pyrimidine as a colourless crystalline solid M.P. 290–292° C. with decomposition.

The 4 - chloro - 2 - methyl-6(1'-semicarbazido)pyrimidine used as starting material may be prepared as follows:

5 parts of 4-chloro-6 hydrazino-2-methyl-pyrimidine are dissolved in 31.5 parts of 2 N aqueous hydrochloric acid. 2.25 parts of sodium cyanate are added and the mixture is heated for 15 minutes at 95–100° C. The mixture is then cooled in ice-water, and the solid product is recovered by filtration, washed with water and dried at 60° C. It is crystallised from a mixture of dimethyl formamide and ethanol. There is thus obtained 4-chloro-2-methyl-6(1'-semicarbazido)pyrimidine as a colourless crystalline solid M.P. 240–241° C. with decomposition.

*Example 23*

5 parts of 2-amino-7-methyl-5-n-propyl-s-triazolo-[2,3-c]-pyrimidine are dissolved in 13 parts of acetic acid and 20 parts of diethylether. The solution is cooled at 18–22° C. and a stream of dry hydrogen chloride bubbled in until precipitation is completed. The yellow solid is recovered by filtration, washed with ether and crystallised from ethanol. There is thus obtained 2-amino-7-methyl-5-n-propyl-s-triazolo-[2,3-c]-pyrimidine hydrochloride as a pale yellow crystalline solid M.P. 213–215° C.

*Example 24*

1.91 parts of 2-amino-7-methyl-5-n-propyl-s-triazolo-[2,3-c]-pyrimidine are dissolved in 10 parts of hot 1 N aqueous hydrochloric acid. 2 parts of potassium iodide are added and the mixture is cooled in ice-water. The solid product is recovered by filtration, washed with water, dried and crystallised from ethanol. There is thus obtained 2-amino - 7 - methyl-5-n-propyl-s-triazolo-[2,3-c]-pyrimidine hydriodide as a pale yellow crystalline salt M.P. 206–208° C. with decomposition.

*Example 25*

1.91 parts of 2-amino-7-methyl-5-n-propyl-s-triazolo-[2,3-c]-pyrimidine are dissolved in 10 parts of hot 1 N aqueous hydrochloric acid. To this solution is added a solution of 1.6 parts of sodium salicylate in 10 parts of hot water. The mixture is cooled in ice-water, filtered and the solid residue is washed with ice-water and dried. There is thus abtained 2-amino-7-methyl-5-n-propyl-s-triazolo-[2,3-c]-pyrimidine salicylate as a colourless crystalline solid, M.P. 129–130° C.

*Example 26*

1.91 parts of 2-amino-7-methyl-5-n-propyl-s-triazolo-[2,3-c]-pyrimidine are dissolved in 10 parts of hot 1 N aqueous hydrochloric acid. To this solution is added a solution of 1.99 parts of 1:1'-methylenebis(2-hydroxy-3-naphthoic acid) in 11 parts of 1 N aqueous sodium hydroxide solution. The mixture is cooled in ice-water and the solid product is recovered by filtration and dried. There is thus obtained the 2-amino-7-methyl-5-n-propyl-s-triazolo-[2,3-c]-pyrimidine salt of 1:1'-methylenebis(2-hydroxy-2-naphthoic acid) as a yellow solid, M.P. 280° C. with decomposition.

*Example 27*

0.5 part of 6-(S-ethylisothiosemicarbazido - 1' - )-4-methyl - 2 - n - propyl pyrimidine hydriodide 5 parts of litharge and 5 parts of 2-ethoxy ethanol are heated under reflux for 2½ minutes. The solid is removed by filtration and the filtrate is evaporated to dryness under reduced pressure and the residue is then extracted with boiling ethyl acetate. The ethyl acetate extract is decolourised with charcoal and the filtrate is cooled in ice-water. The solid is recovered by filtration, washed with ethyl acetate and dried. There is thus obtained 2-amino-7-methyl-5-n-propyl-s-triazolo-[2,3-c]-pyrimidine as a colourless crystalline solid, M.P. 169° C.

The 6-(S-ethylisothiosemicarbazido-1'-)-4-methyl-2-n-propylpyrimidine hydriodide used as starting material may be prepared as follows: 2.25 parts of 6-(thiosemicarbazido-1'-)-4-methyl-2-n-propylpyrimidine, 40 parts of dry ethanol and 2 parts of ethyl iodide are heated under reflux for 1 hour. The suspension gradually dissolves to give a yellow solution which is evaporated to dryness under reduced pressure. The residual solid is dissolved in the minimum quantity of hot water and the solution is neutralised with sodium acetate. The sticky precipitate is separated from the aqueous phase by decantation and is triturated with ethyl acetate. There is thus obtained 6-(S-ethylisothiosemicarbazido-1'-)-4-methyl-2-n - propylpyrimidine hydriodide as a pale yellow solid M.P. 180–182° C. with decomposition.

*Example 28*

2.3 parts of 8-allyl-2-amino-7-methyl-5-n-propyl-s-triazolo-[2,3-c]-pyrimidine monohydrate are dissolved in 32 parts of ethanol, 0.2 part of platinum oxide is added and the mixture is shaken in an atmosphere of hydrogen until 0.23 part of hydrogen is absorbed. The mixture is then filtered and the filtrate is evaporated to dryness under reduced pressure and the residual solid is crystallised from petroleum ether (B.P. 60–80° C.). There is thus obtained 2-amino-7-methyl-5,8-di-n-propyl-s - triazolo - [2,3-c]-pyrimidine as a colourless crystal compound, M.P. 127–128° C.

*Example 29*

5 parts of 8-allyl-2-amino-7-methyl-5-n-propyl-s-triazolo-[2,3-c]-pyrimidine monohydrate are dissolved in 50 parts of acetic acid containing 25 parts of water. 3.5 parts of bromine are added slowly with stirring at 18–22° C. Stirring is continued for a further 30 minutes and the mixture is then cooled at 0° C. and the solid removed by filtration, washed with ice-water, dried and crystallised from ethanol. There is thus obtained 2-amino-8(2',3'-dibromo-1'-n-propyl)-7-methyl-5-n- propyl-s-triazolo-[2,3-c]-pyrimidine as a colourless crystalline compound, M.P. 145–146° C.

Example 30

1.25 parts of 8-allyl-2-amino-7-methyl-5-n-propyl-s-triazolo-[2,3-c]-pyrimidine monohydrate are dissolved in 160 parts of acetone at 18–22° C. A solution of 1.4 parts of potassium permanganate in 140 parts of water is added and the mixture is kept at 18–22° C. until the permanganate colour disappears. The brown residue is removed by filtration and the filtrate is evaporated to dryness and the residue is crystallised from acetone. There is thus obtained 2-amino-8(2',3'-dihydroxy-1'-n-propyl-)7-methyl-5-n-propyl-s-triazolo-[2,3-c]-pyrimidine as a colourless crystalline solid M.P. 177–179° C.

Example 31

1 part of 2-bromo-7-methyl-5-n-propyl-s-triazolo-[2,3-c]-pyrimidine M.P. 88° C. (petroleum ether, B.P. 60–80° C.) is heated with 2 parts of ammonia in 10 parts of β-ethoxyethanol at 180° C. for 48 hours. After cooling the solution is evaporated to dryness under reduced pressure and the residue is crystallised from ethylacetate. There is thus obtained 2-amino-7-methyl-5-n-propyl-s-triazolo-[2,3-c]-pyrimidine, M.P. 169° C.

The 2-bromo-7-methyl-5-n-propyl-s-triazolo-[2,3-c]-pyrimidine used as starting material may be obtained by the action of phosphorus oxybromide on 2-hydroxy-7-methyl-5-n-propyl-s-triazolo[2,3-c]-pyrimidine which itself may be obtained by fusion of 6-(N-carbethoxy-N'-hydrazino)-4-methyl-2-n-propylpyrimidine.

Example 32

10 parts of 2-amino-7-methyl-5-n-propyl-s-triazolo-[2,3-c]-pyrimidine, 75 parts of lactose and 22 parts of maize starch are mixed together and granulated with 20 parts of 10% maize starch paste. The mixture is passed through a 16-mesh screen, dried at a temperature not exceeding 60° C. and the granules are then passed through a 20-mesh screen. 1 part of magnesium stearate is added and the mixture is compressed into tablets each containing the desired weight of active ingredient. There are thus obtained tablets suitable for therapeutic purposes.

The 2-amino-7-methyl-5-n-propyl-s-triazolo-[2,3-c]-pyrimidine used as starting material may be replaced by an equivalent proportion of 2-amino-5:7-di-n-propyl-, 2-amino-5-n-propyl-7-n-butyl- or 2-amino-5-n-propyl-7-ethyl-s-triazolo-[2,3-c]-pyrimidine and there are likewise obtained tablets suitable for therapeutic purposes.

Mono-acyl derivatives of the compounds described and claimed herein are disclosed in our copending application Serial No. 16,123, filed March 21, 1960.

What we claim is:

1. A pyrimidine derivative having a formula selected from the group consisting of:

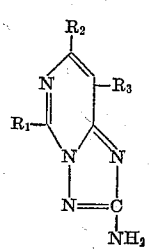

and

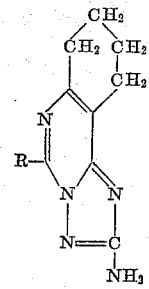

wherein $R_1$ is selected from the group consisting of hydrogen, alkyl of up to 7 carbon atoms, hydroxyalkyl of up to 7 carbon atoms, alkoxyalkyl of up to 9 carbon atoms, halogenoalkyl of up to 7 carbon atoms, allyl, cyclohexyl, amino, monoalkylamino of up to 3 carbon atoms, dimethylamino, phenyl, methylthio and ethylthio; $R_2$ is selected from the group consisting of hydrogen, alkyl of up to 7 carbon atoms, hydroxyalkyl of up to 7 carbon atoms, alkoxyalkyl of up to 9 carbon atoms, halogenoalkyl of up to 7 carbon atoms, allyl, cyclohexyl, monoalkylamino of up to 3 carbon atoms, dimethylamino, methoxy and halogen; $R_3$ is selected from the group consisting of hydrogen, alkyl of up to 7 carbon atoms, hydroxyalkyl of up to 7 carbon atoms, alkoxyalkyl of up to 9 carbon atoms, halogenoalkyl of up to 7 carbon atoms, allyl, cyclohexyl and halogen, and the non-toxic acid-addition salts thereof.

2. 2-amino-5-n-propyl-7-methyl-s-triazolo-[2,3-c]-pyrimidine.

3. 2-amino-5,7-di-n-propyl-s-triazolo-[2,3-c]-pyrimidine.

4. 2-amino-5-n-propyl-7-n-butyl-s-triazolo-[2,3-c]-pyrimidine.

5. 2-amino-5-n-propyl-7-ethyl-s-triazolo-[2,3-c]pyrimidine.

6. Process for the manufacture of the pyrimidine derivatives claimed in claim 1 which comprises reacting a member of the group consisting of pyrimidylhydrazine derivatives having one of the following formulae:

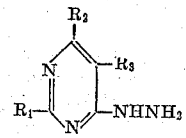

and

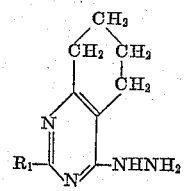

wherein $R_1$, $R_2$ and $R_3$ have the meaning stated in claim 1, and the acid-addition salts thereof, with cyanogen halide.

7. Process as claimed in claim 6 wherein the cyanogen halide is selected from the group consisting of cyanogen chloride and bromide.

8. Process as claimed in claim 6 wherein there is present an inert liquid medium including an acid selected from the group consisting of hydrochloric acid and acetic acid.

No references cited.